March 3, 1936.                    R. K. ALBERT                    2,032,349
                      SWITCHING DEVICE FOR ELECTRIC MOTORS
                              Filed June 7, 1934
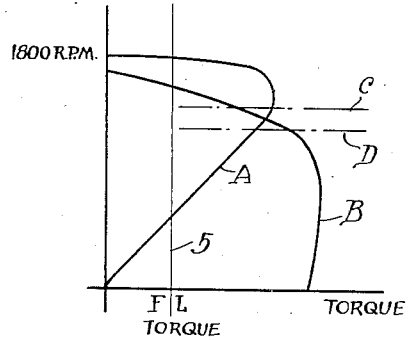
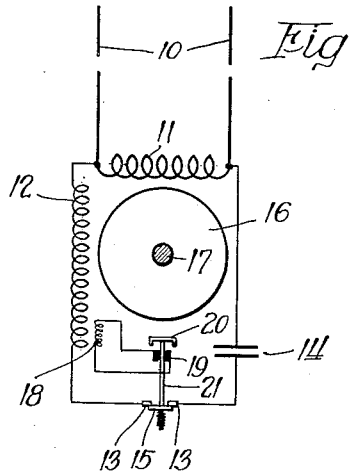
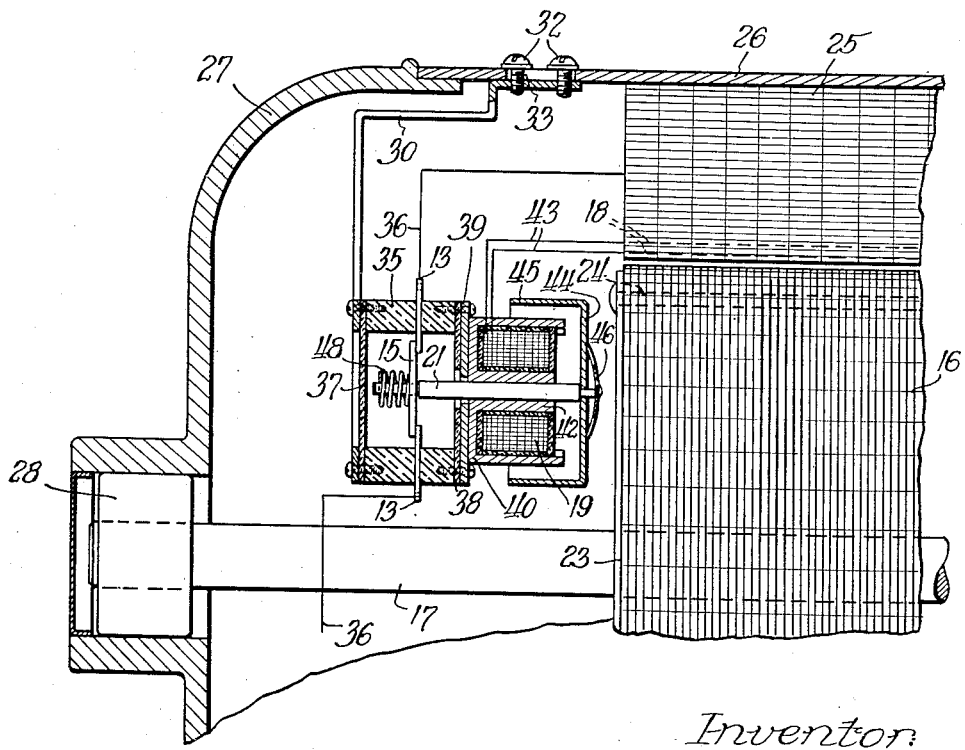
Inventor:
Ralph K. Albert.
By Brown, Jackson, Boettcher & Dienner
Attys.

Patented Mar. 3, 1936

2,032,349

UNITED STATES PATENT OFFICE 2,032,349

SWITCHING DEVICE FOR ELECTRIC MOTORS

Ralph K. Albert, Howell, Mich.

Application June 7, 1934, Serial No. 729,394

17 Claims. (Cl. 172—279)

The present invention relates to a switching device for electric motors, and is particularly directed to a switching mechanism operative to disconnect the starting capacitor used in conjunction with squirrel cage motors and the like.

In prior types of switching mechanisms of this type of which I am aware, the starting winding is ordinarily connected through a switch to the capacitor, and an actuating coil is connected in shunt of the starting winding for opening the switch after the motor picks up speed. Ordinarily, a spring, a holding coil, or gravity is employed for maintaining the switch normally closed. However, with such an arrangement, the insulation of the actuating coil becomes of importance, due to the fact that it may carry voltages considerably in excess of the rated motor voltage, since it is connected directly into the starting winding. Further, spacial requirements, uniformity of construction, simplicity of design, and other considerations are not efficiently met by this type of construction, and its utility is thereby limited.

It has been proposed to remedy some of the above difficulties by providing a coil connected in shunt with the whole or a portion of the secondary or starting winding, which coil magnetically opens the switch controlling the starting circuit as the speed of the motor increases. Such a switching device is described in the patent to Norman S. Yost, No. 1,828,724, of October 20, 1931. However, even in this type of control some means must be provided for maintaining the switch initially closed until the motor picks up speed and the attracting force of the shunt coil increases to an extent sufficient to open the switch. Ordinarily this means comprises a spring, a separate holding coil, or, in situations allowing such a positioning of the switch, by gravity.

The present invention has for its primary object to provide a switch for controlling the starting winding circuit to the capacitor, which has as one actuating force the magnetic flux created by the motor windings themselves, preferably the flux external to the iron circuit of the motor itself, that is, the leakage flux, for example, at the ends of the rotor poles. If desired, however, the actuating force may be derived from any point in the iron circuit, so as to utilize the magnetic flux of the motor windings.

Since this flux, such as the rotor leakage flux, is at a maximum when the motor is at a standstill, and rapidly diminishes to a relatively small value as the motor comes up to a normal speed, I employ this flux as the holding force for maintaining the switch controlling the circuit from the starting winding to the capacitor closed during initial starting of the motor. For opening the switch, I preferably provide a coil wound in inductive relation to the secondary or starting winding of the motor. As the motor picks up in speed, this coil tends to open the switch, overcoming the diminishing force of the magnetic flux, which tends to maintain the switch closed.

This balancing of the opposed magnetic forces of the coil and the leakage flux preferably occurs at a selected point in the torque-speed curve of the particular motor in which the invention is employed, and it is an object of the invention to provide a switching device which is adjustable between wide ranges to obtain operation of the switch at the most efficient and advantageous point on this curve. This adjustment may be obtained by various means to be described in detail later.

Another object of the present invention is to provide an enclosed type of switch unit, whereby the contacts are not subjected to dust, and the like, and any possible arcing is confined within the device itself. In this connection, it is to be pointed out that the contacts are adapted to be maintained clean and free of coatings by a novel wiping action afforded by the present invention.

A further object of the invention is the provision of a switch unit having no frctional or rubbing engagement with the operating parts of the motor, and which is an entirely separate and distinct unit, and is subjected to little or no mechanical friction during its operation, and no parts of which are subject to wearing.

An important advantage secured by the present switching device is that it is self-compensating for variations in line voltage and frequency, and the opposed magnetic forces acting thereon are, as a practical matter, substantially directly variable in accordance with such variations, whereby its operating characteristics remain the same during such variations or changes in line voltage and frequency.

A further feature of the present invention is the particular construction of the magnetic armature or actuator which controls the switch, this member being so shaped as to shield the magnetic coil connected to the secondary winding from the flux leakage field.

Other objects and advantages of the present invention will appear more fully from the following detailed description, which, taken in connection with the accompanying drawing, will disclose to those skilled in the art the particular construction and operation of a preferred form of the present invention.

In the drawing:

Figure 1 is a graphic illustration of the torque-speed characteristics of a motor with and without a starting circuit, indicating the position at which the starting circuit cutout switch should be operative;

Figure 2 is a diagrammatic illustration of the circuit connections of the present invention; and Figure 3 is a vertical sectional view of a portion of a motor provided with the starting device of the present invention.

Referring now in detail to Figure 1, in which speed of the motor is indicated vertically, and the torque of the motor is indicated in a horizontal direction, the line 5 illustrates the full load torque for an ordinary type of motor. Curve A illustrates the characteristics of a motor, such as a single phase alternating current motor of the squirrel cage type, which is not provided with a starting winding, and it will be noted that the curve breaks sharply and the motor cannot be started with any torque load imposed thereon. This is true of all single phase alternating current motors of this type. Curve B illustrates the characteristics of such a motor provided with both a main or field winding and a starting or secondary winding, and shows the manner in which the motor comes up to full speed under varying torque conditions.

The lines C and D indicate the range within which the most efficient and advantageous operation of a disconnect switch for the starting circuit of motors of this type is obtained. Thus, when a motor having the characteristics shown by the curve B is being started, the switch controlling the circuit from the starting winding through the capacitor should be opened between the respective limits defined by the lines C and D on the curve B.

In the present invention, as will be hereinafter described in detail, I have provided means whereby the disconnecting of this switch can be varied within a relatively wide range in order to produce the most efficient cutting out of the starting circuit for the particular type of motor to which the invention is applied.

Considering now the circuit shown in Figure 2, the current supply source or line for the motor is indicated generally by the reference numeral 10. Connected to the line in any suitable manner is the running winding or field winding for the stator of the motor, this winding being shown at 11. Connected to this winding is an ordinary type of phase modifying device, such as the starting winding 12 connected through the switch contacts 13 to the capacitor 14, which winding is preferably connected in quadrature with the winding 11, as is well known to those skilled in the art. When the motor is initially operated from its stand-still position, the switch 13 is maintained closed by the bridging contact 15. This contact or bridging member is preferably maintained in position to close the switch by the magnetic attraction of the leakage field about the rotor 16, mounted upon the shaft 17 of the motor. This magnetic flux may be obtained at any point in the iron circuit of the motor, or may be external to the iron circuit itself, in which case it comprises the leakage field flux emanating from the ends of the laminated plates comprising the rotor of the motor.

This flux, and therefore the force created thereby, is at a maximum when the motor is at a standstill, and diminishes rapidly as the motor comes up to normal speed. In order to open the switch, I provide an inductive winding 18, which preferably is in shunt of the starting winding 12, and which is inductively wound about the whole or a portion of the secondary or starting winding. The winding 18 is connected to a magnetic actuating coil indicated at 19, which is adapted to attract the magnetic armature 20 carried upon the spindle 21, when the motor reaches a speed such as indicated by the line D, in Figure 1.

Thus, as the motor begins to accelerate, the magnetic flux tending to attract the armature 20, and to hold the switch in closed position, decreases. At the same time, the force or magnetic attraction exerted by the coil 19 on the armature 20 increases. At some desired predetermined point, this latter force overcomes the magnetic attraction of the flux or leakage field of the rotor 16 and draws the armature 20 outwardly of the rotor, and consequently draws the bridge contact 15 away from the stationary contacts 13 in the starting circuit, thus disconnecting the capacitor from the circuit.

In the practical embodiment of the invention, as shown in Figure 3, in which I have illustrated a partial sectional view of a single-phase alternating current squirrel cage motor of any ordinary type, the shaft 17 has mounted thereon a plurality of laminated members comprising the rotor 16, the end laminations or rings of the rotor being preferably formed of copper, as indicated at 23. The laminations are held in fixed position by means of rotor bars or rivet members extending therethrough, indicated at 24, which are headed over at their outer ends to maintain the end rings 23 in position. Disposed concentrically about the rotor 16, and spaced therefrom, is the stator 25, which has the field or running winding 11 disposed therein.

A portion of the motor frame, comprising the cylindrical housing 26, extends about the stator 25, and is closed at its end portions by means of the frame members 27 secured thereto, having a bearing 28 at the shaft-engaging end for supporting the shaft 17. Mounted upon the inner surface of the frame 26 is a bracket member 30, which preferably is provided with securing means 32, having engagement within a slot 33 formed in the frame 26, which bracket is adapted to support the starting device for the motor.

This starting device includes a switch housing 35 having positioned therein stationary switch contacts, such as contacts 13, which contacts are connected through conductors 36 to the starting winding 12, and to the capacitor 14, respectively. The housing 35 is formed of insulating material, and is closed adjacent the bracket 30 by means of a mica disc or closure member 37. Any desired type of insulating closure member may be employed. At its opposite end there is provided a second insulating disc 38, over which is disposed a metallic plate 39, which may be supported in any desired manner upon the housing 35. For example, suitable screws may extend from the bracket 30, and from the closure plate 39 into the housing 35.

Mounted upon the closure plate 39, and extending outwardly therefrom, is a metallic bracket member 40 formed of magnetic material, and which is provided with a central bearing portion 42, adapted to receive the spindle 21 of the switch operating member. The bracket 40 is recessed to receive the magnetic coil 19, which is connected through conductors 43 to the starting winding 12 disposed within the stator. The conductors 43 are placed in inductive relation with respect to the starting winding, the number of turns of the coil 18 in inductive relation being determined by the force desired to be exerted by the coil 19.

The magnetic armature 44, which is mounted upon the spindle 21, at the outer projecting end thereof, is substantially cup-shaped in form, having its lip portion 45 extending over and substantially enclosing the bracket 40. This is for the purpose of shielding the bracket 40 and the coil 19 from the leakage field adjacent the end plate 23 of the rotor. The armature 44 is mounted upon a reduced shoulder portion of the spindle 21 by means of a flexible spring member 46, bearing against the outer surface of the armature 44, and secured in position beneath the headed end 47 of the spindle. The inner extending end of the spindle 21 is provided with a bridging disc 15, as described in connection with Figure 2, which disc is mounted for sliding movement upon the spindle, and is resiliently supported in position thereon by means of the spring 48, secured at one end to the disc 15, and, at its opposite end, to the spindle 21. This provides for resilient engagement of the disc 15 with the contacts 13, and attraction of the armature 44 by the leakage field adjacent the end of the rotor.

In the operation of the switch when the line current from the conductors 10 is first connected to the windings within the stator 25, the leakage current about the ends of the rotor extends outwardly in substantially fanlike formation, as is well known. This magnetic flux tends to draw the armature 44 toward the rotor, thus forcing the bridging contact 15 to engage across the switch contacts 13 to close the circuit between the starting winding 12 and the capacitor 14. As the speed of the motor increases, the magnetic attraction of the leakage field on the armature 44 decreases, while the magnetic attraction of the coil, due to its inductive shunt connection with the starting winding, increases.

At a predetermined point, the force of the coil 19 overcomes the magnetic attraction of the leakage field, and the armature 44 is moved into engagement with the extending ends of the bracket 40. This forces the disc 15 away from the contacts 13, thus opening the circuit to the capacitor 14 and disconnecting the capacitor from the starting circuit. The spring member 46 provides for small relative angular movement between the armature 44 and the spindle 21, and allows the armature to seat securely upon the extending ends of the bracket 40 to prevent rattling or vibration thereof during normal operation of the motor.

The point at which the coil 19 overcomes the force of the magnetic flux, due to the leakage field about the end of the rotor, can be varied within wide limits. Thus, by adjusting the position of the bracket 30 with respect to the frame 26, the entire unit may be moved inwardly or outwardly with respect to the unit, thus increasing or decreasing the effective force of this magnetic field flux upon the armature 44. By increasing or decreasing the number of turns of the inductive winding 18 about the starting winding 12, the strength of the disconnecting coil 19 can be increased or decreased as desired. Further, the entire unit may be shifted angularly with respect to the rotor to vary its position, since its magnetic field emanating from the ends of the rotor varies between adjacent poles thereof, this magnetic field being capable of determination, so that the unit may be placed in any desired position therein. Preferably the unit is so disposed that it is substantially centered with respect to the rotor poles adjacent which it is positioned, so that the magnetic flux acts equally thereupon.

It will be noted that the only bearing surface in the switch unit comprises the bearing 42 which supports the spindle 27 for shifting movement. Since the spindle moves only a relatively small distance from open to closed position of the switch, there is little or no wear thereupon, since the spindle is subjected only to axial thrust. Also, by the provision of the armature 44 in a circular form with a circular disc 15 employed as the bridging connection between the contacts 13, a wiping contact engagement is obtained between the member 15 and the contacts 13, which maintains these contact surfaces free from coating dirt and the like. Rotation of the armature upon starting of the motor results in rotating the disc 15, and consequently cleans the contacts 13.

It is also apparent that by enclosing the switch contacts and bridging member within the housing 35 and closure members 37 and 38 there is no opportunity for dust, gases, or the like, to enter into the switch housing or contacts, and arcing between the contacts is also confined within this housing.

The switch device may also be employed with the vertical shaft type motors, in which case the bracket member 30 is shifted with respect to the frame to an extent such that the magnetic flux of the leakage field about the rotor, added to the gravitational force exerted upon the armature 44 by reason of its weight, can be overcome at a desired torque-speed position of the motor to provide for opening of the switch by attraction of the armature through coil 19. Also by providing various sizes of brackets 30, the unit may be disposed at any desired position from the shaft 17, whereby the magnetic force, due to the leakage field at the end of the rotor, can be varied by positioning the unit radially with respect to the shaft.

Since the winding 18 is connected in shunt of the secondary winding 12, it is apparent that it will vary substantially directly with variations in the line voltage and frequency. Also, since the magnetic flux or leakage field of the rotor is substantially directly proportional to the line voltage and frequency, it will be apparent that the switching device is self-compensating, in that both of the magnetic forces acting upon the armature 44 vary substantially directly with line voltage and frequency, and therefore maintain their operating characteristics regardless of such variations.

I am aware that many structural changes and modifications may be made in details of the switch mechanism which is disclosed herein, and I do not intend to be limited to the specific details shown and described, but only as defined by the scope and spirit of the appended claims.

I claim:—

1. In an electric motor having a starting winding and a capacitor, switch means therebetween, a rotor having a magnetic leakage field thereabout during initial starting of said motor, a magnetic actuating coil connected inductively to said starting winding, and means responsive to the differential magnetic attraction of said leakage field and said coil for controlling operation of said switch means.

2. In an electric motor having a starting circuit and a rotor having a magnetic leakage field emanating therefrom during initial starting of said motor, a magnetic actuating coil connected inductively to said starting circuit, means responsive to differential magnetic attraction of said leakage field and said coil for controlling said starting circuit, and means for varying the relative attraction of said field upon said controlling means.

3. In an electric motor having a starting circuit and a rotor having a magnetic leakage field emanating therefrom during initial starting of said motor, a magnetic actuating coil connected inductively to said starting circuit, means responsive to differential magnetic attraction of said leakage field and said coil for controlling said starting circuit, and means for varying the relative magnetic attraction of said coil upon said controlling means.

4. In an electric motor, a starting circuit therefor, a shaft, a rotor mounted thereon, a stator surrounding said rotor, a frame for said motor, said rotor having a magnetic leakage field thereabout during initial starting of said motor, an electromagnetic coil inductively connected to said stator, and means responsive to the differential attraction of said magnetic leakage field and said coil for controlling said starting circuit.

5. A switch cutout for the starting circuit of an electric motor including a cup-shaped armature having its base portion presented to the leakage field of the rotor of an electric motor, a magnetic disconnect coil for said armature, a spindle for rotatably supporting said armature, and a bearing for said spindle having a bracket portion supporting said magnetic disconnect coil and disposed coaxially of said armature, the defining cylindrical portion of said armature extending over and shielding said bracket and coil from said leakage field, said coil being adapted to overcome the attraction of said field at a predetermined speed of said motor to draw said armature outwardly of said rotor to actuate said cutout.

6. Switch means for the starting circuit of a single phase alternating current motor including a pair of switch contacts, a bridging disc for engaging said contacts, a rotatable spindle supporting said disc, an armature carried by said disc, a coil inductively connected in the starting circuit for said motor, and disposed adjacent said armature, and means for positioning said armature in the magnetic leakage field of said motor.

7. In an electric motor, a rotor, a stator having a main winding and a starting winding, a capacitor in series with said starting winding, switch means for said capacitor, means for actuating said switch means disposed in the magnetic leakage field of said rotor and initially responsive thereto for closing said switch means upon starting of said motor, and disconnect means inductively connected to said starting winding for magnetically attracting said switch actuating means to open said switch means after said motor has attained a predetermined speed.

8. In an electric motor having a rotor and including a starting winding connected in series with a capacitor, switch means for disconnecting said capacitor including a magnetically responsive armature, means for positioning said armature in the leakage field of said rotor to maintain said switch means closed during initial actuation of said motor, and means connected in series with said starting winding for opening said switch means when said motor has reached a predetermined speed.

9. In an electric motor having a starting winding and a capacitor connected in series, switch means for disconnecting said capacitor including means normally responsive to the flux of the iron circuit of said motor to maintain said switch means closed, and means connected inductively into said starting winding for attracting said flux-responsive means into switch-open position when a predetermined motor speed is attained.

10. In an electric motor having a starting winding and a capacitor connected in series, switch means for disconnecting said capacitor including means normally responsive to the flux of the iron circuit of said motor to maintain said switch means closed, and means connected inductively into said starting winding for attracting said flux-responsive means into switch-open position when a predetermined motor speed is attained, said switch means being adjustable to vary the intensity of magnetic attraction of said iron circuit upon said flux-responsive means.

11. Switch means for the starting circuit of an electric motor comprising an armature positioned in the magnetic leakage field of said motor and initially attracted upon starting of said motor to close said switch, and means connected inductively into said starting circuit for overcoming said magnetic leakage field attraction and for attracting said armature into switch opening position when said motor has attained a predetermined speed.

12. Switch means for the starting circuit of an electric motor, comprising an armature positioned in the magnetic leakage field of said motor and initially attracted upon starting of said motor to close said switch, means connected inductively into said starting circuit for overcoming said magnetic leakage field attraction and for attracting said armature into switch opening position when said motor has attained a predetermined speed, said magnetic leakage field and said last named means being substantially self-compensating for variations in line voltage and frequency, and means for adjusting the position of said armature to vary the point at which said magnetic field attraction is overcome.

13. In an electric motor having a starting winding and capacitor in series, switch means for said capacitor including means responsive to the flux of the iron circuit of said motor for holding said switch means normally closed, and means inductively connected into said starting winding and responsive to predetermined motor speed for opening said switch means.

14. In an electric motor having a capacitor in series with a starting circuit, switch means therefor, means responsive to the flux of the iron circuit of said motor for normally maintaining said switch means closed, actuating means inductively connected into said starting circuit, and means responsive to said actuating means upon decrease in flux of said iron circuit for opening said switch means when a predetermined motor speed is attained.

15. Switch means for the starting circuit of a motor of the class described comprising a pair of contacts, means for bridging said contacts, means responsive to the flux of the iron circuit of the motor for normally maintaining said bridging means in contact-engaging position, and means responsive to predetermined flux of armature reaction in said motor for moving said bridging means out of engagement.

16. In an electric motor of the class described including a rotor having a magnetic leakage field emanating therefrom during initial starting of said motor, a starting circuit for said motor, electromagnetic means inductively connected into said circuit, and means responsive to differential attraction of said field and electromagnetic means for controlling said starting circuit.

17. In an electric motor having a rotor, a starting circuit for said motor, a magnetically controlled switch for said circuit normally held closed by the magnetic leakage field of said rotor, electromagnetic means inductively connected into said starting circuit for overcoming the attraction of said leakage field to open said switch upon predetermined motor speed, and means for varying the effective attraction of said leakage field upon said switch.

RALPH K. ALBERT.